(12) United States Patent
Kim et al.

(10) Patent No.: US 11,669,201 B2
(45) Date of Patent: Jun. 6, 2023

(54) ELECTRONIC DEVICE AND METHOD FOR INPUT COORDINATE PREDICTION

(71) Applicant: Samsung Electronics Co., Ltd., Suwon-si (KR)

(72) Inventors: Dohyeon Kim, Suwon-si (KR); Taewon Kwak, Suwon-si (KR); Donghyuk Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/716,618

(22) Filed: Apr. 8, 2022

(65) Prior Publication Data
US 2023/0051541 A1 Feb. 16, 2023

Related U.S. Application Data

(63) Continuation of application No. PCT/KR2022/003695, filed on Mar. 16, 2022.

(30) Foreign Application Priority Data

Jul. 29, 2021 (KR) ........................ 10-2021-0099851

(51) Int. Cl.
*G06F 3/041* (2006.01)
(52) U.S. Cl.
CPC ........ *G06F 3/04166* (2019.05); *G06F 3/0418* (2013.01)
(58) Field of Classification Search
CPC ......................... G06F 3/04166; G06F 3/0418
See application file for complete search history.

(56) References Cited

U.S. PATENT DOCUMENTS

| | | | |
|---|---|---|---|
| 5,995,081 | A | 11/1999 | Kato |
| 8,674,943 | B2 | 3/2014 | Westerman et al. |
| 10,365,765 | B2 | 7/2019 | Lee et al. |
| 10,942,646 | B2 | 3/2021 | Poon et al. |
| 2014/0160032 | A1 | 6/2014 | Che et al. |

(Continued)

FOREIGN PATENT DOCUMENTS

| | | |
|---|---|---|
| JP | 3052997 B2 | 6/2000 |
| JP | 2014-092849 A | 5/2014 |

(Continued)

OTHER PUBLICATIONS

Bocheng Zhao et.al, 'Pen Tip Motion Prediction for Handwriting Drawing Order Recovery using Deep Neural Network', 2018 24th International Conference on Pattern Recognition (ICPR), pp. 704-709, Aug. 20-24, 2018.

(Continued)

*Primary Examiner* — Michael Pervan
(74) *Attorney, Agent, or Firm* — Jefferson IP Law, LLP

(57) ABSTRACT

An electronic device is provided. The electronic device includes a display, a memory, and a processor operatively connected to the display and the memory. The processor, in response to receiving at least one touch input to the display, analyzes an input characteristic of the at least one touch input, based on the at least one touch input, generates predictive coordinate points corresponding to a plurality of different time points, respectively, and based on the input characteristic, determines a number of predictive coordinate points to be used.

23 Claims, 14 Drawing Sheets

(56) References Cited

U.S. PATENT DOCUMENTS

2015/0355778 A1    12/2015   Kim et al.
2016/0092021 A1    3/2016    Tu et al.
2017/0083156 A1*   3/2017    Lee ...................... G06F 3/0485

FOREIGN PATENT DOCUMENTS

| KR | 10-2014-0103777 A | 8/2014 |
| KR | 10-2015-0091512 A | 8/2015 |
| KR | 10-2017-0033656 A | 3/2017 |
| KR | 10-2017-0061703 A | 6/2017 |
| KR | 10-2018-0010555 A | 1/2018 |

OTHER PUBLICATIONS

International Search Report dated Jun. 10, 2022, issued in International Patent Application No. PCT/KR2022/003695.

* cited by examiner

810

820

812

822

ELECTRONIC DEVICE AND METHOD FOR INPUT COORDINATE PREDICTION

CROSS-REFERENCE TO RELATED APPLICATION(S)

This application is a continuation application, claiming priority under § 365(c), of an International application No. PCT/KR2022/003695, filed on Mar. 16, 2022, which is based on and claims the benefit of a Korean patent application number 10-2021-0099851, filed on Jul. 29, 2021, in the Korean Intellectual Property Office, the disclosure of which is incorporated by reference herein in its entirety.

TECHNICAL FIELD

The disclosure relates to an electronic device and method for predicting input coordinates. More particularly, the disclosure relates to a technology for correcting a time delay (latency) until final drawing by generating a plurality of predictive coordinate points in an electronic device.

BACKGROUND ART

With the development of mobile communication technology and hardware and/or software technology, a portable electronic device (hereinafter, referred to as an electronic device) comes to implement a variety of functions in addition to a traditional call function. In particular, electronic devices are becoming smaller and slimmer, and adopting a touch screen to provide a more convenient user interface (UI).

The touch screen is a device that detects a touch input of various pointing devices (e.g., a finger, a stylus, a touch pad, a pen mouse, or an air mouse) on a display to enable an interface between an electronic device and a user. The touch screen is widely used in various devices and various fields. The electronic device may show a stroke corresponding to the touch input on the display. The electronic device may perform a rendering operation to depict such a stroke corresponding to the touch input on the display. The rendering operation may be delayed for a certain time depending on the performance of a micro-processor of the electronic device.

The electronic device may analyze an input characteristic of at least one received touch input. The electronic device may learn a coordinate predictive model based on the analyzed input characteristic, and output a predictive path (drawing) based on touch inputs up to now by using the coordinate predictive model. The electronic device may correct a time delay (latency) through predictive drawing up to a point that has not yet been inputted.

The above information is presented as background information only to assist with an understanding of the disclosure. No determination has been made, and no assertion is made, as to whether any of the above might be applicable as prior art with regard to the disclosure.

DISCLOSURE OF INVENTION

Technical Problem

In a conventional electronic device, a time delay (latency) may occur due to a time required for a rendering operation for outputting an image to a display. In order to solve this issue, a method for correcting the time delay by predicting a progress path of a stroke was adopted. However, when a user's handwriting speed is fast, an error in a predictive path may increase and a prediction quality may be deteriorated. When the predictive path is a straight line, the error is relatively small, but when the predictive path is a curve, there may be a large difference from a path actually intended by the user.

In addition, even when the error of the predictive path is small, the predictive path may be expressed as a straight line instead of a curved shape, which may appear unnatural. Because the conventional electronic device connects predictive coordinate points with a straight line, the predictive path may not be expressed as a smooth curve and may appear unnaturally like a straight chord.

Aspects of the disclosure are to address at least the above-mentioned problems and/or disadvantages and to provide at least the advantages described below. Accordingly, an aspect of the disclosure is to provide a more natural and accurate prediction when an electronic device attempts to correct a time delay (latency) of a handwriting input by using predictive coordinate points as described above.

Additional aspects will be set forth in part in the description which follows and, in part, will be apparent from the description, or may be learned by practice of the presented embodiments.

Solution to Problem

In accordance with an aspect of the disclosure, an electronic device is provided. The electronic device includes a display, a memory, and a processor operatively connected to the display and the memory. The processor may be configured to, upon receiving at least one touch input to the display, analyze an input characteristic of the at least one touch input, to, based on the at least one touch input, generate predictive coordinate points respectively corresponding to a plurality of different time points, and to, based on the input characteristic, determine the number of predictive coordinate points to be used.

In accordance with another aspect of the disclosure, a method for predicting handwriting input coordinates of an electronic device is provided. The method includes, upon receiving at least one touch input to a display, analyzing an input characteristic of the at least one touch input, based on the at least one touch input, generating predictive coordinate points respectively corresponding to a plurality of different time points, and based on the input characteristic, determining the number of predictive coordinate points to be used.

Advantageous Effects of Invention

According to various embodiments, the electronic device may output a more natural predictive path by generating a plurality of predictive coordinate points instead of one predictive coordinate point. The electronic device may generate a plurality of predictive coordinate points by using the characteristics of input coordinate points and a coordinate predictive model, and may improve the user experience by connecting the predictive coordinate points with a curve.

According to various embodiments, the electronic device may reduce an error of a predictive path by determining the number of generated predictive coordinate points to be used in accordance with a predetermined criterion. An unstable state may occur when there is a large error in predictive coordinate points and there is a high risk of being drawn to an incorrect predicted position. Thus, the electronic device may determine whether a handwriting input state is in an unstable state according to various criteria, and in case of the unstable state, may use only a part of the predictive coordinate points to reduce an error. Through this, the predictive path can be outputted as intended by the user.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

MODE FOR THE INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In describing embodiments, descriptions of technical contents that are well known in the technical field to which the disclosure pertains and are not directly related to the disclosure will be omitted. In addition, redundant description of elements having substantially the same configuration and function will be omitted.

For the same reason, some elements are exaggerated, omitted, or schematically illustrated in the accompanying drawings. In addition, the depicted size of each element does not fully reflect the actual size. Therefore, the disclosure is not limited by a relative size or spacing depicted in the accompanying drawings.

Figure 1:
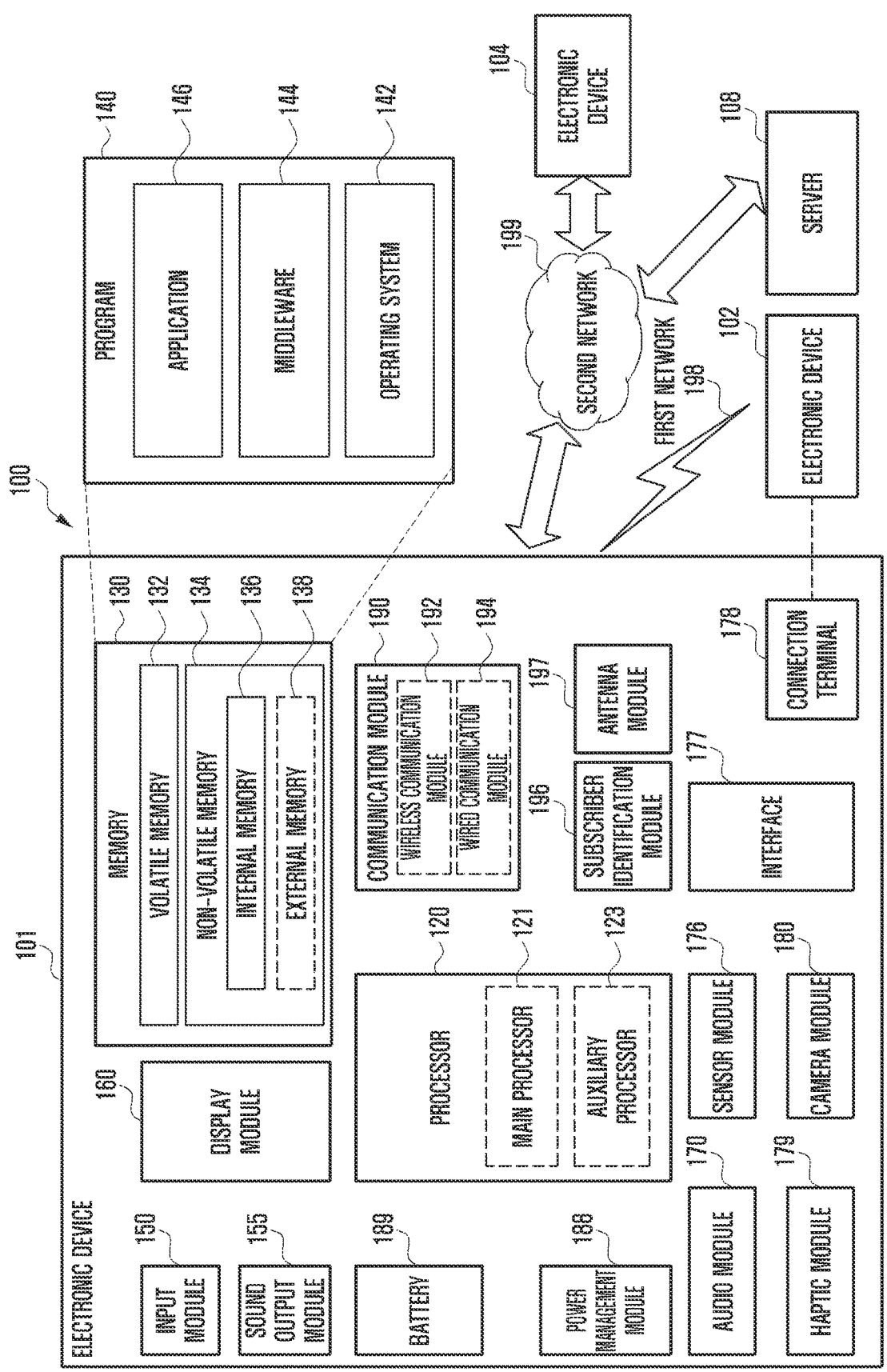
FIG. 1 is a block diagram illustrating an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an external electronic device 102 via a first network 198 (e.g., a short-range wireless communication network), or at least one of an external electronic device 104 or a server 108 via a second network 199 (e.g., a long-range wireless communication network). According to an embodiment, the electronic device 101 may communicate with the external electronic device 104 via the server 108. According to an embodiment, the electronic device 101 may include a processor 120, memory 130, an input module 150, a sound output module 155, a display module 160, an audio module 170, a sensor module 176, an interface 177, a connection terminal 178, a haptic module 179, a camera module 180, a power management module 188, a battery 189, a communication module 190, a subscriber identification module (SIM) 196, or an antenna module 197. In some embodiments, at least one of the components (e.g., the connection terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., the external electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

The connection terminal 178 may include a connector via which the electronic device 101 may be physically connected with the external electronic device (e.g., the external electronic device 102). According to an embodiment, the connection terminal 178 may include, for example, a HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a $5^{th}$ generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4th generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the external electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of lms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form an mm Wave antenna module. According to an embodiment, the mm Wave antenna module may include a printed circuit board, a RFIC disposed on a first surface (e.g., the bottom surface) of the printed circuit board, or adjacent to the first surface and capable of supporting a designated high-frequency band (e.g., the mm Wave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment, all or some of operations to be executed at the electronic device 101 may be executed at one or more of the external electronic devices 102 and 104 or the server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1$^{st}$" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively," as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2A:
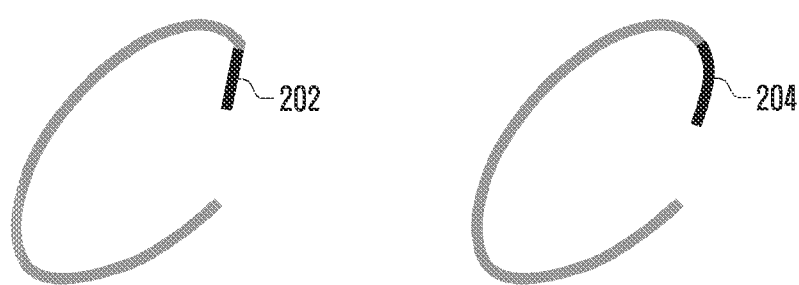
FIGS. 2A, 2B, and 2C illustrate examples of outputting a predictive path at an electronic device according to various embodiments of the disclosure.
Figure 2B:
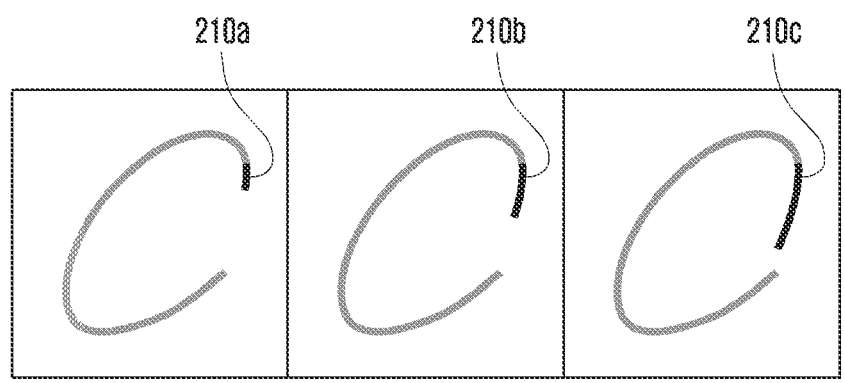
Figure 2C:
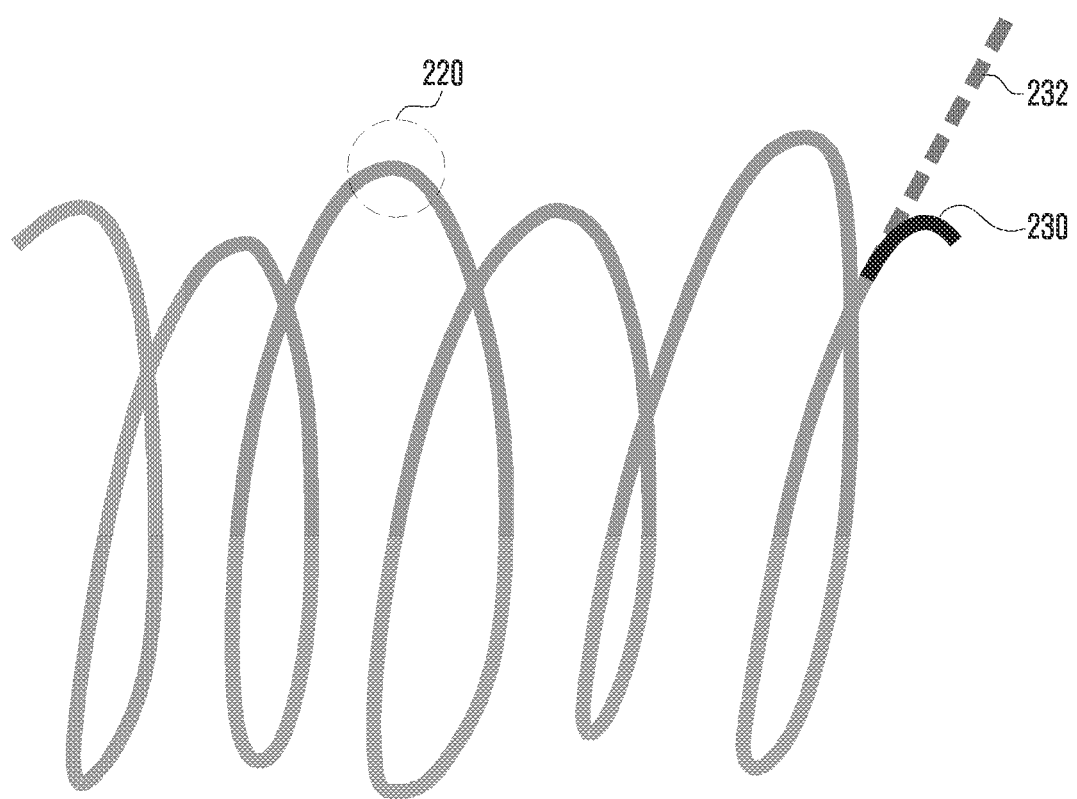

FIGS. 2A, 2B, and 2C illustrate examples of outputting a predictive path at an electronic device according to various embodiments of the disclosure.

Referring to FIG. 2A, an electronic device (e.g., an electronic device 101 in FIG. 1) may output a predictive path through single-coordinate prediction or multi-coordinate prediction. In order to prevent latency due to rendering, the electronic device may generate a predictive coordinate point and, based on the predictive coordinate point, output a predictive path. The single-coordinate prediction refers to a method of outputting a predictive path based on a single predictive coordinate point, and the multi-coordinate prediction refers to a method of outputting a predictive path based on a plurality of predictive coordinate points. When the electronic device performs the single-coordinate prediction, faster correction can be performed due to fewer calculations. On the other hand, when the electronic device performs the multi-coordinate prediction, more precise correction can be performed in consideration of various input characteristics.

According to various embodiments, the electronic device may output different forms of predictive paths depending on a coordinate predictive model used. For example, as shown in FIG. 2A, a single-coordinate predictive path 202 and a multi-coordinate predictive path 204 may be outputted in different forms. The single-coordinate predictive path 202 may be outputted in a form that a straight line connects a touch coordinate point last received at a first time point and a predictive coordinate point corresponding to a second time point. Thus, a predictive path outputted by the single-coordinate prediction may have an unnatural shape when a touch input is made of a curve. The multi-coordinate predictive path 204 may be outputted in a form that a curved line connects a touch coordinate point last received at a first time point, a first predictive coordinate point corresponding to a second time point, a second predictive coordinate point corresponding to a third time point, and a third predictive coordinate point corresponding to a fourth time point. Thus, a predictive path outputted by the multi-coordinate prediction may have a natural shape even when a touch input is made of a curve. Hereinafter, the predictive coordinate points will be described as including at least one of the first predictive coordinate point, the second predictive coordinate point, and the third predictive coordinate point, but embodiments of predictive coordinate points are not limited thereto.

Referring to FIG. 2B, an electronic device may output a predictive path by using at least one of generated predictive coordinate points. The electronic device may generate at least one predictive coordinate point at a first time point and determine the number of predictive coordinate points to be used in accordance with a predetermined condition. For example, the number of predictive coordinate points to be used may be determined, based on an input characteristic including acceleration and angular acceleration of a handwriting input, or based on whether it is in an unstable state. According to an embodiment, when a prediction error is equal to or greater than a predetermined value, the electronic device may not output a predictive path. For example, the electronic device may generate a predictive path by using the predictive coordinate point generated at the first time point and calculate the prediction error before outputting the predictive path to the display. When the prediction error is equal to or greater than the predetermined value, the electronic device may output the predictive path by re-generating a predictive coordinate point at the second time point instead of using the predictive coordinate point generated at the first time point. The electronic device may determine the number of predictive coordinate points to be used in accordance with a predetermined criterion, and output a predictive path 210a using one predictive coordinate point, a predictive path 210b using two predictive coordinate points, and a predictive path 210c using three predictive coordinate points. Embodiments of the predictive paths outputted by the electronic device are not limited to the above example. A detailed algorithm for the electronic device to determine the number of predictive coordinate points to be used will be described in detail later with reference to FIGS. 7 and 8A to 8C.

Referring to FIG. 2C, an electronic device may output a more natural predictive path by using the multi-coordinate prediction than the single-coordinate prediction. The electronic device may extract input characteristics by analyzing previous input coordinate points and, based on the extracted input characteristics, generate at least one predictive coordinate point. For example, from a handwriting input, the electronic device may extract the input characteristics by analyzing curved coordinate points 220 indicating a rapid change in direction. Then, at a first time point when a touch input is last made, the electronic device may output a predictive path using predictive coordinate points generated based on the extracted input characteristics. If the single-coordinate prediction is performed, the electronic device may output a predictive path 232 in the form of a straight line by referring only to the last coordinate point inputted at the first time point. Because the single-coordinate prediction outputs a predictive path based on only one input coordinate point, it is relatively difficult to predict a curve, which may cause a problem in that a prediction error increases. On the other hand, when the multi-coordinate prediction is performed, the electronic device may output a predictive path 230 having an abrupt change of direction in consideration of previously inputted coordinate points including the curved coordinate points 220. Using such a coordinate predictive model, the electronic device may provide a more natural predictive path to a user while correcting a time delay (latency) due to rendering.

Figure 3:
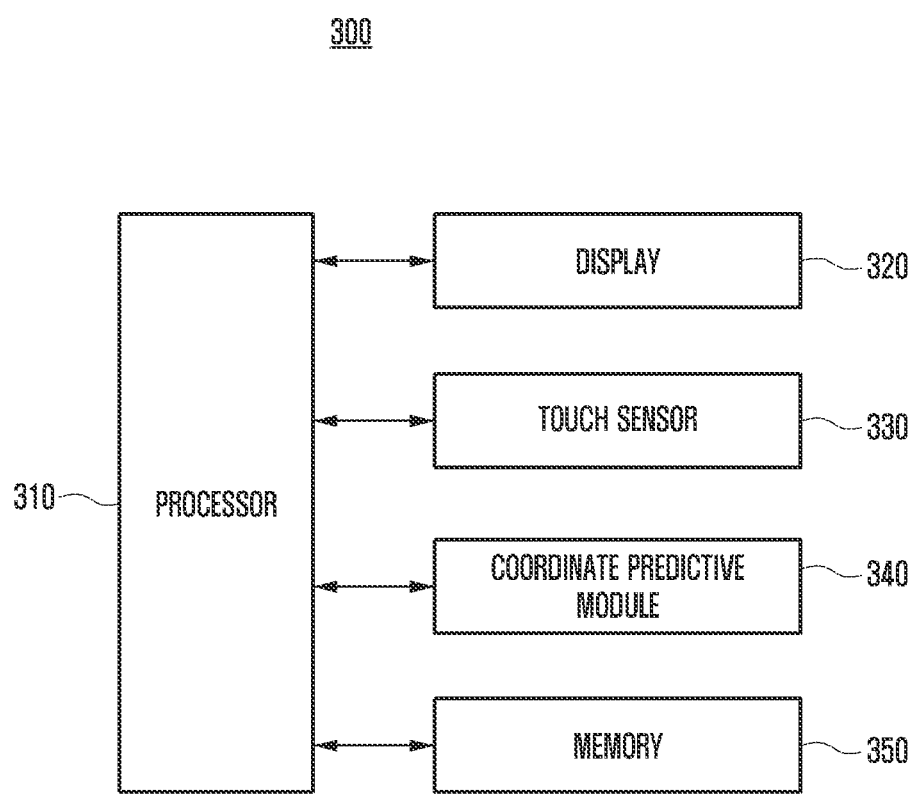
FIG. 3 is a block diagram illustrating an electronic device according to an embodiment of the disclosure.

FIG. 3 is a block diagram illustrating an electronic device according to an embodiment of the disclosure.

Referring to FIG. 3, an electronic device 300 may include a display 320, a touch sensor 330, a coordinate predictive module 340, a processor 310, and/or a memory 350. In various embodiments, some of the illustrated components may be omitted or substituted. The electronic device 300 may further include at least some of the components and/or functions of the electronic device 101 in FIG. 1. At least some of the respective illustrated (or not illustrated) components of the electronic device 300 may be operatively, functionally, and/or electrically connected to each other.

According to various embodiments, the display 320 may display various images under the control of the processor 310. The display 320 may be implemented with, but is not limited to, any one of a liquid crystal display (LCD), a light-emitting diode (LED) display, a micro LED display, a quantum dot (QD) display, or an organic light-emitting diode (OLED) display. The display 320 may be formed of a touch screen that senses a touch input and/or proximity touch (or hovering) input using a user's body part (e.g., a finger) or an input device (e.g., a stylus pen). The display 320 may include at least a part of the constitution and/or function of the display module 160 in FIG. 1.

According to various embodiments, the display 320 may be flexible at least in part and may be implemented as a foldable display or a rollable display.

According to various embodiments, the touch sensor 330 may include at least a part of the constitution and/or functions of the sensor module 176 in FIG. 1, and may receive a user input on the display 320. The touch sensor 330 may be implemented with, but is not limited to, any one of a conductivity sensor, a capacitive touch sensor, a resistive touch sensor, a surface touch sensor, a projected captivated (PCAP) touch sensor, or a surface acoustic wave touch sensor. The display 320 of the electronic device 300 may be composed of one or more touch sensors 330.

According to various embodiments, the coordinate predictive module 340 may generate at least one predictive coordinate point, based on a received touch input. The coordinate predictive module 340 may generate at least one predictive coordinate point by establishing a coordinate predictive model. The coordinate predictive module 340 may generate a coordinate predictive model using various algorithms According to an embodiment, if a calculated prediction error is equal to or greater than a predetermined value, the processor 310 may not output a predictive path using predictive coordinate points. The coordinate predictive module 340 may learn a touch input by using a machine learning algorithm. The coordinate predictive module 340 may learn a touch input through an algorithm using an artificial neural network (ANN) that includes at least one of a convolutional neural network (CNN) and a recurrent neural network (RNN). According to an embodiment, the coordinate predictive module 340 may generate a convolution layer by examining adjacent components of data and identifying features, and generate a pooling layer with a reduced layer size. According to an embodiment, the last layer of the coordinate predictive module 340 may be a fully connected layer in which neurons contained in the layer are connected to all neurons of the previous layer. Although the coordinate predictive module 340 is illustrated in FIG. 3 as being separate from the memory 350, it may be implemented with instructions executable by the processor 310 and included in the memory 350.

According to various embodiments, the memory 350 may include a volatile memory (e.g., the volatile memory 132 in FIG. 1) and a non-volatile memory (e.g., the non-volatile memory 134 in FIG. 1) and store various kinds of data temporarily or permanently. The memory 350 may include at least a part of the constitution and/or function of the memory 130 in FIG. 1 and may store the program 140 in FIG. 1.

According to various embodiments, the memory 350 may store various instructions that can be executed by the processor 310. Such instructions may include control commands such as arithmetic and logical operations, data movement, or input/output that can be recognized by the processor 310.

According to various embodiments, the processor 310 may be operatively, functionally, and/or electrically connected to the respective components (e.g., the display 320, the touch sensor 330, the coordinate predictive module 340, and the memory 350) of the electronic device 300 and may perform operations or data processing related to control and/or communication of the respective components. The processor 310 may include at least a part of the constitution and/or function of the processor 120 in FIG. 1.

Although there will be no limitations to the operations and data processing functions that the processor 310 can implement in the electronic device 300, various embodiments in which the electronic device 300 naturally corrects a time delay (latency) of a handwriting input by using predictive coordinate points will be described hereinafter. Operations of the processor 310 to be described later may be performed by loading instructions stored in the memory 350.

According to various embodiments, the processor 310 may receive a touch input to the display 320. The display 320 may include the touch screen, and the processor 310 may detect a touch input to the touch screen and generate an input coordinate point corresponding to each touch input.

According to various embodiments, the processor 310 may extract an input characteristic by analyzing the input coordinate points of at least one received touch input. The processor 310 may transmit information about the input coordinate points to the coordinate predictive model. The processor 310 may control the coordinate predictive model to analyze the input coordinate points and extract the input characteristic for the input coordinate points of one or more touch inputs and a combination thereof. The input characteristic may include at least one of an x coordinate, a y coordinate, a coordinate distance, a velocity, an acceleration, an angular velocity, an angular acceleration, a pen pressure, a tilt, and an orientation of a touch input.

According to various embodiments, the processor 310 may generate at least one predictive coordinate point, based on the input characteristic. Different predictive coordinate points generated by the processor 310 may correspond to different time points, respectively. According to an embodiment, the processor 310 may generate predictive coordinate points at predetermined time intervals (e.g., every 8 ms) from the current time point or generate predictive coordinate points corresponding to a plurality of time points without fixed time intervals. The processor 310 may generate the predictive coordinate points by controlling the coordinate predictive model. The coordinate predictive model may generate the predictive coordinate points through machine learning based on the input coordinates of at least one received touch input and the analyzed input characteristic.

For example, based on the input coordinate points of touch inputs received up to a first time point, the processor 310 may generate a first predictive coordinate point corresponding to a second time point, a second predictive coordinate point corresponding to a third time point, and a third predictive coordinate point corresponding to a fourth time point. The processor 310 may generate, at the first time point, the predictive coordinate points corresponding to the second, third, and fourth time points at one time. The first predictive coordinate point corresponding to the second time point, the second predictive coordinate point corresponding to the third time point, and the third predictive coordinate point corresponding to the fourth time point may be learned while being influenced by each other as well as the input coordinates received up to the first time point.

According to various embodiments, the processor 310 may determine the number of predictive coordinate points to be used. When it is determined that a prediction error with respect to the final predictive coordinate point is highly likely to occur or the prediction accuracy is low, the processor 310 may conservatively perform correction by using only some of the generated predictive coordinate points. If it is determined that a prediction error is unlikely to occur at a later time point, the processor 310 may perform active time delay correction by using all the generated predictive coordinate points. Hereinafter, a case in which the processor 310 uses only some of the predictive coordinate points will be described in detail.

According to various embodiments, based on the input characteristics, the processor 310 may determine the number of predictive coordinate points to be used. The processor 310 may determine a reference value for at least a part of the input characteristics and compare a measured value with the reference value to determine the number of predictive coordinate points to be used. For example, the processor 310 may determine an acceleration reference value and an angular acceleration reference value and compare respectively an acceleration measured value with the acceleration reference value and an angular acceleration measured value with an angular acceleration reference value. The processor 310 may determine differently the number of predictive coordinate points to be used, in case that the acceleration measured value is higher than the acceleration reference value and the angular acceleration measured value is higher than the angular acceleration reference value, in case that the acceleration measured value is higher than the acceleration reference value and the angular acceleration measured value is lower than the angular acceleration reference value, in case that the acceleration measured value is lower than the acceleration reference value and the angular acceleration measured value is higher than the angular acceleration reference value, and in case that the acceleration measured value is lower than the acceleration reference value and the angular acceleration measured value is lower than the angular acceleration reference value.

According to various embodiments, the processor 310 may determine the number of predictive coordinate points to be used, by determining whether or not an unstable state is present. In case that an input device does not sense the input coordinates uniformly, or in case that an input pattern has a high probability of generating a prediction error even though the input coordinates are sensed normally, the processor 310 may generate erroneous predictive coordinate points. As a result, a predictive path outputted by the processor 310 by connecting such erroneous predictive coordinate points may have a large error from a path intended by the user. If the error of the outputted predictive path is expected to be large, the processor 310 may determine this state as an unstable input state and output a predictive path relatively short by using only a part of the generated predictive coordinate points. Based on a predetermined criterion, the processor 310 may determine the number of predictive coordinate points to be used, in an unstable state. For example, the processor 310 may configure a first reference value, a second reference value, and a third reference value for the input characteristic of a touch input. Then, the processor may determine the number of predictive coordinate points as a first number if the input characteristic is equal to or greater than the first reference value, as a second number if less than the first reference value and equal to or greater than the second reference value, as a third number if less than the second reference value and equal to or greater than the third reference value, and as a fourth number if less than the third reference value.

According to an embodiment, the processor 310 may determine as an unstable state when the overall length of the predictive path generated based on the predictive coordinate points is equal to or greater than a predetermined length. The processor 310 may generate a plurality of predictive coordinate points for respective time zones and output the predictive path by connecting the predictive coordinate points. The processor 310 may determine a reference value of the overall length of the predictive path, and determine as the unstable state when the input device normally senses the input coordinates but the overall length of the output predictive path is equal to or greater than the reference value. The processor 310 may determine the reference value of the overall length of the predictive path that is large enough to significantly correct time delay due to rendering and small enough that an error between the predictive path and an actual path is not too large.

According to an embodiment, the processor 310 may determine as an unstable state when a distance difference between predictive coordinate points is equal to or greater than a predetermined value. The processor 310 may determine a reference value of the distance difference between the predictive coordinate points, and determine as the unstable state when a distance between two predictive coordinate points of the closest time zones is equal to or greater than the reference value.

According to an embodiment, the processor 310 may determine as an unstable state when a travel angle of a predictive path based on predictive coordinate points is equal to or greater than a predetermined angle. The processor 310 may determine a reference value of the travel angle of the predictive path, and determine as the unstable state when the travel angle of the predictive path is equal to or greater than the reference value.

According to various embodiments, the processor 310 may output a predictive path by connecting predictive coordinate points determined to be used. According to an embodiment, the processor 310 may output a predictive path connecting predictive coordinate points in the form of a curve.

Figure 4:
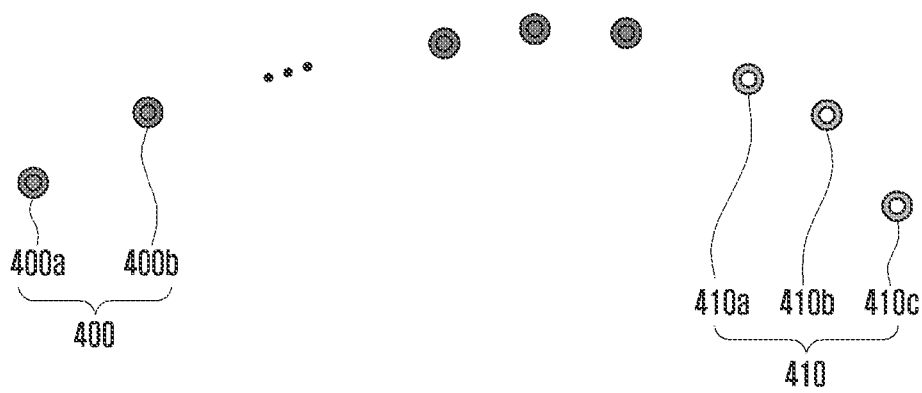
FIG. 4 illustrates an example of generating predictive coordinate points based on input coordinates at an electronic device according to an embodiment of the disclosure.

FIG. 4 illustrates an example of generating predicted coordinates based on input coordinates at an electronic device according to an embodiment of the disclosure.

Referring to FIG. 4, a processor (e.g., a processor 310 in FIG. 3) may receive at least one touch input and generate at least one predictive coordinate point 410. According to various embodiments, the processor may obtain at least one input coordinate point 400 corresponding to each touch input of a pointing device. For example, the processor may generate a first input coordinate point 400a corresponding to a first touch input and a second input coordinate point 400b corresponding to a second touch input.

According to various embodiments, the processor may extract an input characteristic by analyzing the at least one input coordinate point 400. The input characteristic may include at least one of an x coordinate, a y coordinate, a coordinate distance, a velocity, an acceleration, an angular velocity, an angular acceleration, a pen pressure, a tilt, and an orientation of the at least one input coordinate point 400. For example, the processor may measure the x and y coordinates of the first input coordinate point 400a, the x and y coordinates of the second input coordinate point 400b, the pen pressure, tilt, and orientation at the first input coordinate point 400a, the pen pressure, tilt, and orientation at the second input coordinate point 400b, and the distance, velocity, and/or acceleration from the first input coordinate point 400a to the second input coordinate point 400b. To this end, the processor may acquire information including at least one of motion, coordinates, velocity, acceleration, pressure, and orientation from a sensor module (e.g., the sensor module 176 in FIG. 1).

According to various embodiments, the processor may generate the at least one predictive coordinate point 410, based on the extracted input characteristic. The processor may generate the at least one predictive coordinate point 410 that best match a user's intention of handwriting, based on the input characteristic. According to an embodiment, the processor may generate at least one predictive coordinate point 410 for each time zone. For example, based on touch inputs up to a first time point, the processor may generate a first predictive coordinate point 410a corresponding to a second time point, a second predictive coordinate point 410b corresponding to a third time point, and a third predictive coordinate point 410c corresponding to a fourth time point. A time between the first and second time points, a time between the second and third time points, and a time between the third and fourth time points may be equal to or different from each other. The processor may generate the at least one predictive coordinate point 410 that are less likely to cause an error, based on the input characteristics. According to an embodiment, in order to reduce the possibility of an error, when the overall length of a predictive path is equal to or greater than a reference value, the processor may configure the time between the first and second time points to be shorter, and configure the time between the second and third time points to be longer.

According to various embodiments, the processor may output a predictive path by connecting the first predictive coordinate point 410a, the second predictive coordinate point 410b, and the third predictive coordinate point 410c. According to an embodiment, the processor may output the predictive path in a natural form, based on the input characteristic. For example, the processor may output the predictive path in the form of a natural curve connecting the first predictive coordinate point 410a, the second predictive coordinate point 410b, and the third predictive coordinate point 410c.

Figure 5:
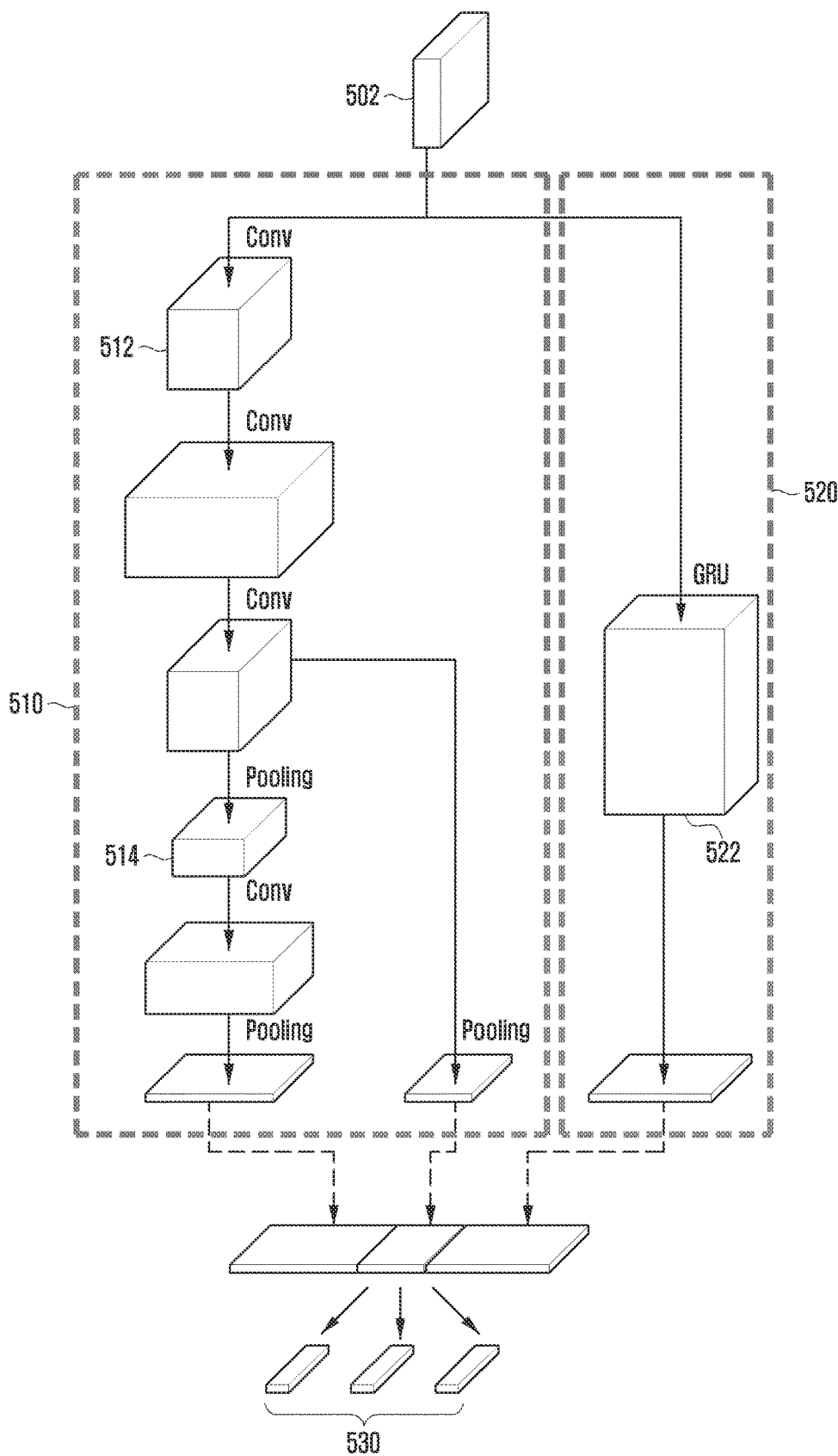
FIG. 5 illustrates a multi-coordinate predictive model of an electronic device according to an embodiment of the disclosure.

FIG. 5 illustrates a multi-coordinate predictive model of an electronic device according to an embodiment of the disclosure.

Referring to FIG. 5, a processor (e.g., a processor 310 in FIG. 3) may generate at least one predictive coordinate point 530 (e.g., at least one predictive coordinate point 410 in FIG. 4) by controlling a coordinate predictive model. Although FIG. 5 shows an embodiment in which the processor generates three predictive coordinate points as the at least one predictive coordinate point 530, it is possible to generate various numbers of predictive coordinate points in embodiments of the disclosure.

According to various embodiments, the processor may transmit data on a touch input to the coordinate predictive model and control it to learn a user's handwriting habit through machine learning and generate the at least one predictive coordinate point 530. For example, at a first time point, the processor may transmit input characteristic data about at least one previously entered touch input to the coordinate predictive model. The coordinate predictive model may learn the data through machine learning and generate the at least one predictive coordinate point 530.

According to various embodiments, the processor may compose the data to be transmitted to the coordinate predictive model in an N*F size using F features (e.g., a relative distance between coordinate points, a pen pressure, a tilt, an orientation) extracted from N consecutive input coordinate points (e.g., the at least one input coordinate point 400 in FIG. 4). The coordinate predictive model may compose a B*N*F size by mapping as much as a size B of a batch 502 for parallel processing in a data learning operation.

According to various embodiments, the coordinate predictive model may include a spatial information extractor 510 and a temporal information extractor 520. The spatial information extractor 510 may analyze input coordinates of a stroke and thereby extract spatial information about the input coordinates (e.g., x and y coordinates) acquired by the processor up to the first time point. For example, the spatial information is feature information and may have arbitrary values calculated internally in the processor and outputted in a real number (or floating point) form. The temporal information extractor 520 may extract, based on the input coordinates (e.g., 12 to 20) up to the first time point, information that changes with time between the corresponding coordinates. The coordinate predictive model may generate the at least one predictive coordinate point 530 by using the information extracted by the spatial information extractor 510 and the temporal information extractor 520.

According to various embodiments, the spatial information extractor 510 may learn data by using at least one convolutional neural network (CNN) block. A block may be a structural unit including at least one layer. The multi-coordinate predictive model may learn to extract spatial feature information (or spatial information) from input data at the CNN block. In an actual model operation process, the multi-coordinate predictive model may extract the spatial feature information from the input data passing through the CNN block. Similarly, the multi-coordinate predictive model may learn to extract temporal feature information (or time-varying information, temporal information) at a recurrent neural network (RNN) block and then extract the temporal feature information from actually input data. The spatial information extractor 510 may include at least one convolution layer 512 performing a convolution operation and at least one pooling layer 514 performing a pooling operation. The spatial information extractor 510 may learn information (or spatial information of a stroke) about an outline (e.g., a straight line or a curved line) of a stroke made of touch inputs. The CNN-based layer may perform a plurality of convolution operations applying a filter of a specified size, and the at least one pooling layer 514 may perform a data compression operation. A result of performing this operation only once and a result of performing it multiple times may be combined and used at the same time.

The processor may extract the spatial feature information of the input coordinates through the spatial information extractor 510.

According to various embodiments, the temporal information extractor 520 may learn data (e.g., time information of a stroke) by using at least one RNN block. The RNN block may perform calculation by continuously transferring information (hidden state) from the previous time step to the next time step. The RNN-based layer may include a long short-term memory (LSTM) or gated recurrent unit (GRU) having a hidden unit of a specified size. The GRU 522 is a simplified form of the LSTM cell and may perform an operation to obtain a weight of each piece of information. According to an embodiment, an additional RNN layer may be disposed before or after the RNN layer. The temporal information extractor 520 may analyze a relationship between the n-th point and the n+1-th point, learn information that changes with time, and thereby extract meaningful temporal features.

Figure 6:
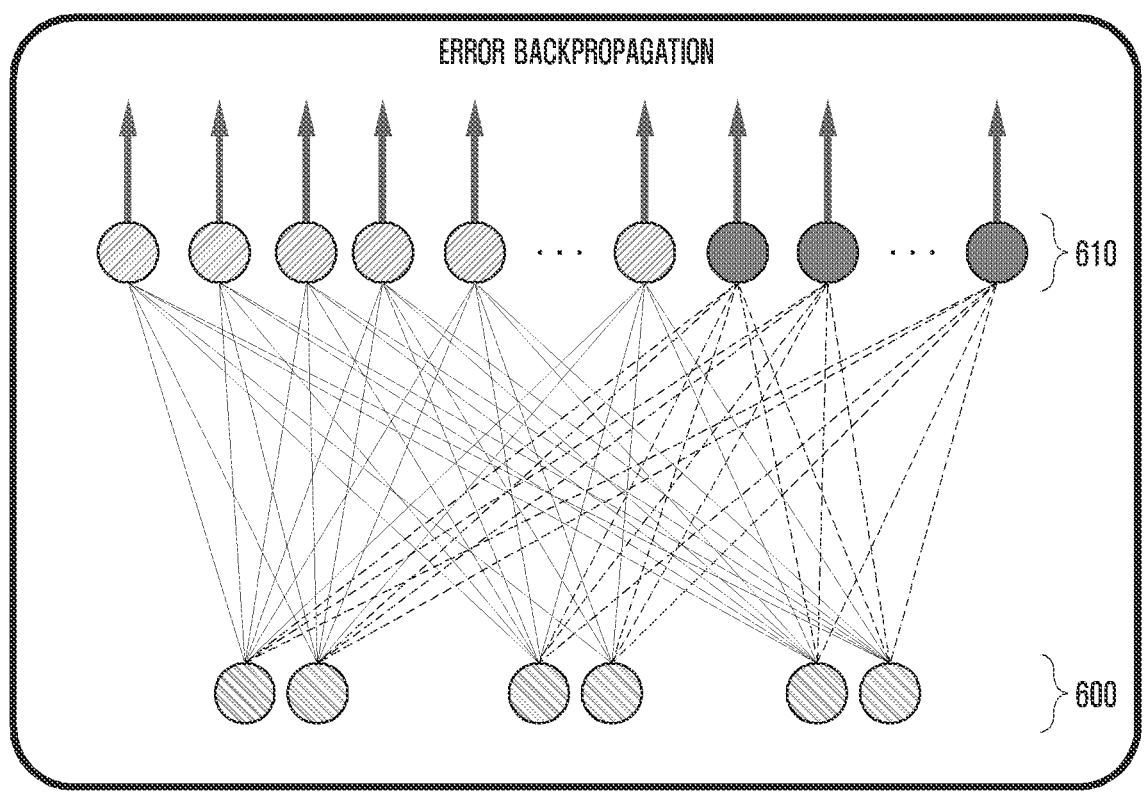
FIG. 6 illustrates a final dense layer in a coordinate predictive model of an electronic device according to an embodiment of the disclosure.

FIG. 6 illustrates a final dense layer in a coordinate predictive model of an electronic device according to an embodiment of the disclosure.

Referring to FIG. 6, a coordinate predictive model may perform concatenation of spatial and temporal characteristics respectively extracted from a CNN layer and RNN layer, compose a final layer as a fully connected layer, and thereby generate a desired number of predictive coordinate points (e.g., at least one predictive coordinate point 410 in FIG. 4). In the fully connected layer, neurons in all layers are connected to neurons in the next layer, and it may be used to classify images through a flattened matrix in the form of a one-dimensional array. The final dense layer formed of the fully connected layer may be constructed such that all neurons of a final output end 600 and an upper layer 610 are connected to each other as shown in FIG. 6.

According to various embodiments, a processor (e.g., the processor 310 in FIG. 3) may integrate errors generated at all final output ends 600 in the hidden node and perform error backpropagation to the upper layer 610. That is, the final output end 600 may generate different output coordinate points for respective time zones, and errors in different predictive coordinate points for such time zones affect each other to allow such predictive coordinate points to have correlation with each other. The predictive coordinate points that are different for respective time zones operate independently, so that errors generated inconsistently with each other can be corrected and the predictive coordinate points can be more accurately generated.

Figure 7:
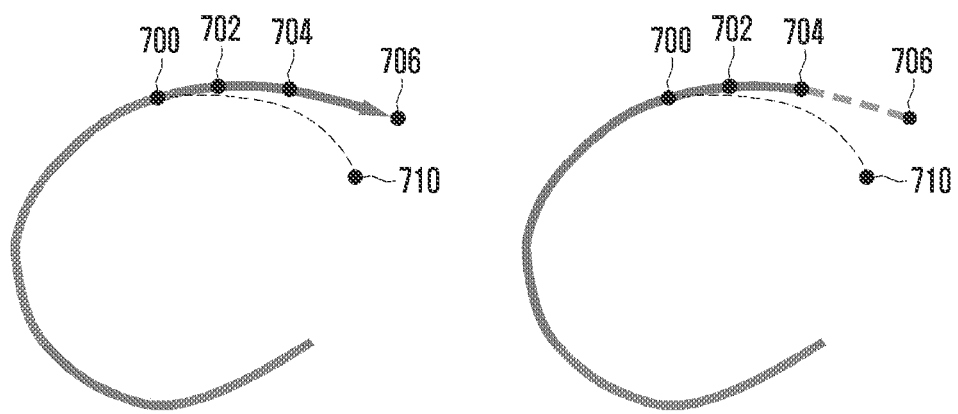
FIG. 7 illustrates an example of using only a part of predictive coordinate points at an electronic device according to an embodiment of the disclosure.

FIG. 7 illustrates an example of using only a part of predictive coordinate points at an electronic device according to an embodiment of the disclosure.

Referring to FIG. 7, a processor (e.g., a processor 310 in FIG. 3) may output a predictive path by using only a part of generated predictive coordinate points (e.g., at least one predictive coordinate point 410 in FIG. 4) when the error of the predictive path is expected to be large. For example, based on previous input coordinate points (e.g., the at least one input coordinate point 400 in FIG. 4), the processor may output the predictive path that connects an input coordinate point 700 of a first time point, a first predictive coordinate point 702 of a second time point, a second predictive coordinate point 704 of a third time point, and a third predictive coordinate point 706 of a fourth time point. In this case, if a prediction error is greater than or equal to a predetermined value, a large difference may occur between the predictive path and a path to a target coordinate point 710 that the user actually wants to draw. The processor may not use some of the generated predictive coordinate points so as to improve the user experience. For example, the processor may output the predictive path by not using the third predictive coordinate point 706 of the fourth time point, but only using the first predictive coordinate point 702 of the second time point and the second predictive coordinate point 704 of the third time point. Through this, the processor may output the predicted path in which a path to the target coordinate point 710 is not significantly deviated.

According to various embodiments, the processor may configure a criterion for determining the number of predictive coordinate points to be used. The processor may use only a part of the predictive coordinate points when it is determined that the input and output states are unstable, based on at least a part of input characteristics. According to an embodiment, the processor may output a predictive path by using only a predetermined ratio of the generated predictive coordinate points. Hereinafter, in FIGS. 8A, 8B, and 8C, various criteria for the processor to determine the number of predictive coordinate points to be used will be described in detail.

Figure 8A:
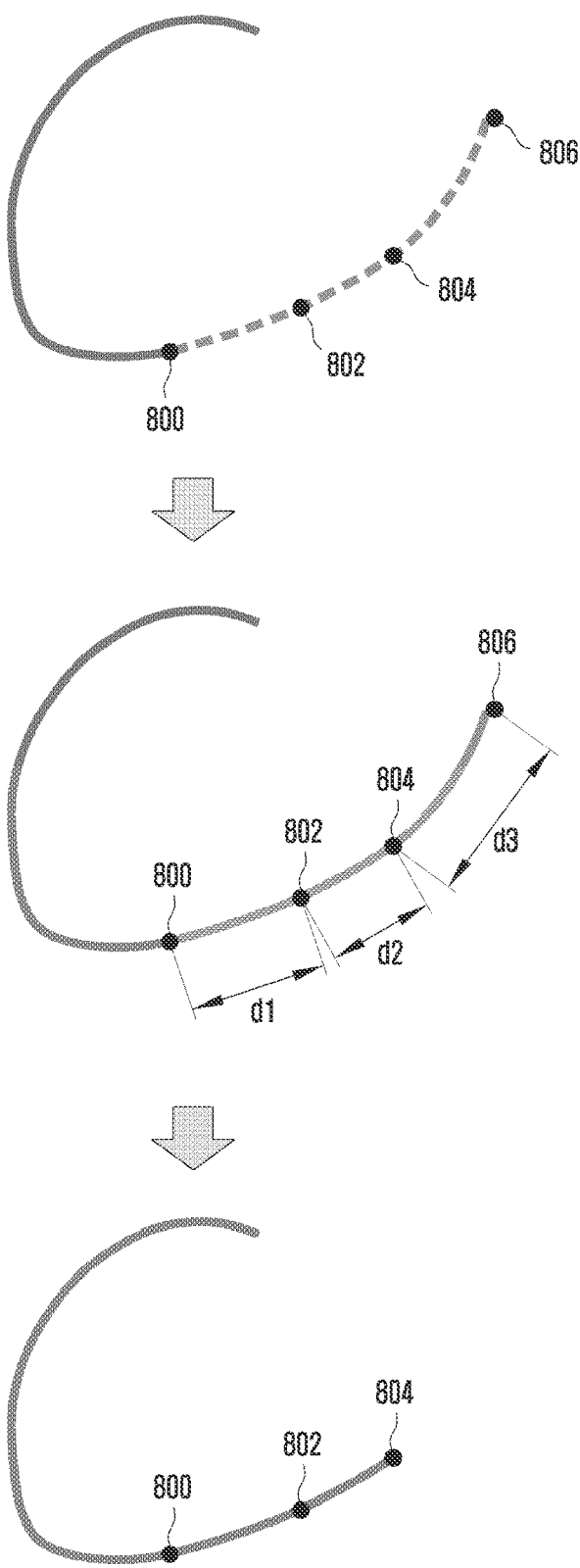
FIGS. 8A, 8B, and 8C illustrate examples of determining a number of predictive coordinate points to be used in accordance with various criteria at an electronic device according to various embodiments of the disclosure.
Figure 8B:
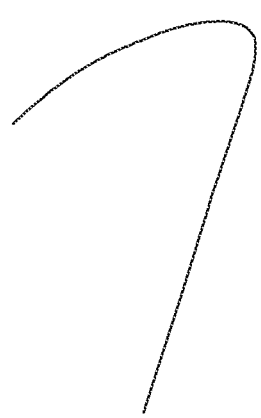
Figure 8B:
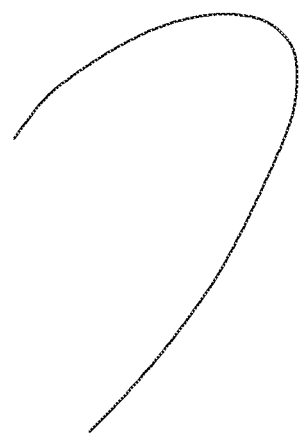
Figure 8B:
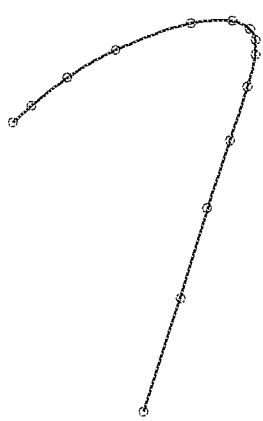
Figure 8B:
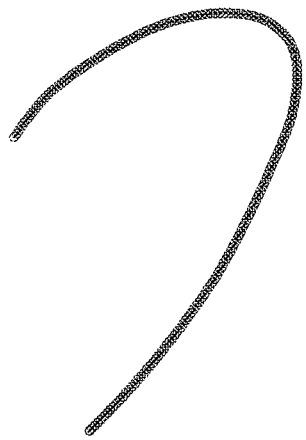
Figure 8C:
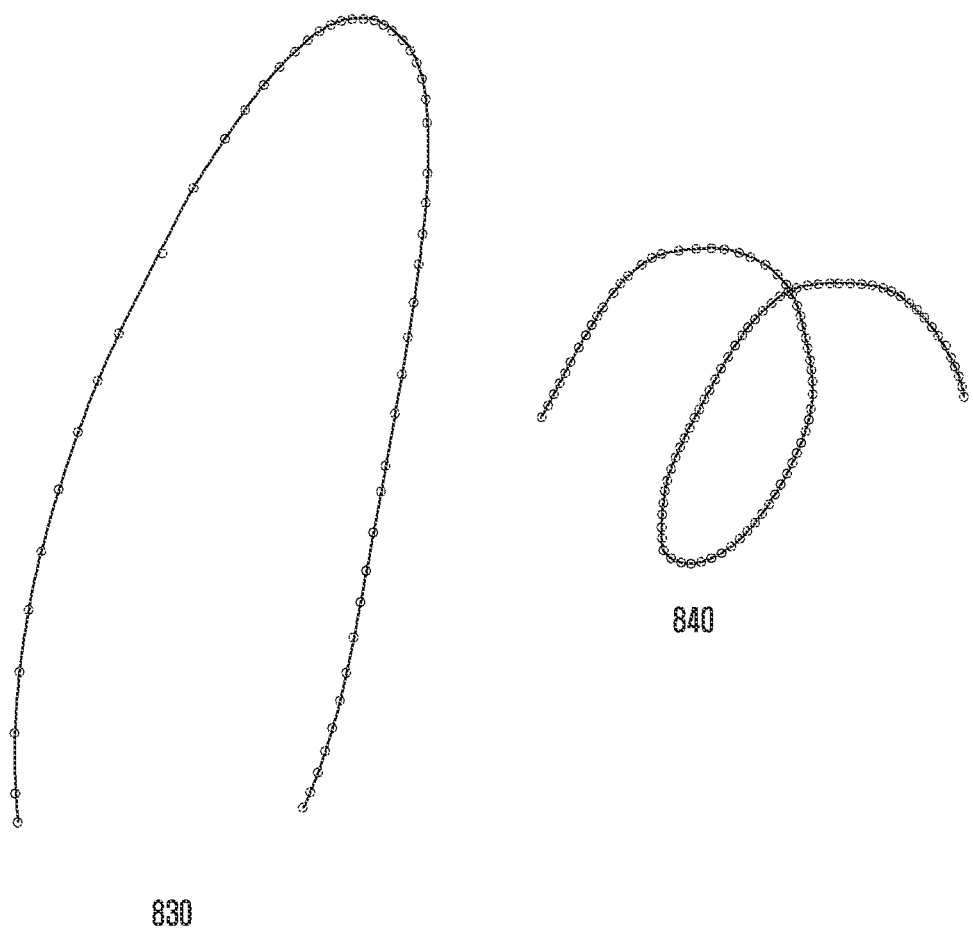

FIGS. 8A, 8B, and 8C illustrate examples of determining a number of predictive coordinate points to be used in accordance with various criteria at an electronic device according to various embodiments of the disclosure.

According to various embodiments, the length of a predictive path outputted using generated predictive coordinate points (e.g., the at least one predictive coordinate point 410 in FIG. 4) is equal to or greater than a predetermined value, a processor (e.g., the processor 310 in FIG. 3) may use only a part of the predictive coordinate points.

Referring to FIG. 8A, a processor may generate a touch coordinate point 800 finally received at a first time point, a first predictive coordinate point 802 corresponding to a second time point, a second predictive coordinate point 804 corresponding to a third time point, and a third predictive coordinate point 806 corresponding to a fourth time point. The processor may measure a first distance d1 between the touch coordinate point 800 of the first time point and the first predictive coordinate point 802, a second distance d2 between the first predictive coordinate point 802 and the second predictive coordinate point 804, and a third distance d3 between the second predictive coordinate point 804 and the third predictive coordinate point 806. The processor may determine a reference value of the overall length of the predictive path and, if the sum (d1+d2+d3) of the first distance, the second distance, and the third distance is equal to or greater than the reference value, use only a part of the generated predictive coordinate points. For example, the processor may output the predictive path by connecting only the first and second predictive coordinate points 802 and 804 without using the third predictive coordinate point 806.

According to various embodiments, the processor may use only a part of the predictive coordinate points generated with reference to the touch input characteristic. The processor may determine the number of predictive coordinate points to be used by using at least some of various items of the input characteristic. For example, the processor may generate the first predictive coordinate point 802 corresponding to the second time point, the second predictive coordinate point 804 corresponding to the third time point, and the third predictive coordinate point 806 corresponding to the fourth time point, and determine the number of predictive coordinate points to be used by using the acceleration and angular acceleration of a touch input. For this, the processor may determine an acceleration reference value and an angular acceleration reference value.

According to various embodiments, the processor may measure velocity and acceleration, based on a distance between adjacent input coordinate points. For all input coordinate points, the processor may measure distances between two adjacent coordinate points, determine an input as an input of a constant velocity if the measured distances are constant, and determine an input as an input with acceleration if the measured distances are changed. In case of the constant velocity input, the processor may determine that an input speed is higher as the distance between adjacent coordinate points is large. The higher the input speed, the higher the error of the predictive coordinate point generated by the processor can be. In the same way, the processor may calculate the velocity and acceleration of a handwriting input by calculating the degree to which the distance between adjacent coordinate points gradually increases or decreases.

Referring to FIG. 8B, based on an acceleration measurement value, a processor may determine the number of predictive coordinate points to be used. The processor may configure an acceleration reference value, compare it with the acceleration of a handwriting input measured based on a distance between adjacent coordinate points, and thereby determine the number of predictive coordinate points to be used. FIG. 8B shows an acceleration stroke 810, a constant velocity stroke 820, and paths on which touch coordinate points are displayed. The acceleration stroke 810 and the constant velocity stroke 820 have similar shapes outputted on a display (e.g., the display 320 in FIG. 3), but they may have different touch coordinate points. That is, comparing acceleration stroke coordinate points 812 and constant velocity stroke coordinate points 822, the acceleration stroke coordinate points 812 may be distributed relatively farther apart from each other than the constant velocity stroke coordinate points 822. The processor may measure the acceleration, based on the touch coordinate points. The processor may determine an acceleration reference value and determine whether the measured acceleration is equal to or greater than the reference value.

According to various embodiments, the processor may calculate the angular velocity and the angular acceleration similar to calculating the velocity and acceleration of the touch input. That is, the processor may calculate the angular velocity and the angular acceleration by calculating a change in orientation of input coordinate points. For example, the processor may receive a first input coordinate point, a second input coordinate point, a third input coordinate point, and a fourth input coordinate point. The processor may calculate a first angle from the first input coordinate point to the second input coordinate point, calculate a second angle from the second input coordinate point to the third input coordinate point, and calculate a second angle from the third input coordinate point to the fourth input coordinate point. When the handwriting input is performed at an equal angular velocity, the first angle, the second angle, and the third angle may be the same. If the second angle is greater than the first angle and if the third angle is greater than the second angle, the processor may determine that the angular acceleration acts on the handwriting input while the first to fourth input coordinate points are inputted.

Referring to FIG. 8C, a processor may determine the number of predictive coordinate points to be used, based on the angular acceleration measurement value. The processor may configure an angular acceleration reference value, compare it with the above-described measured angular acceleration of the handwriting input, and thereby determine the number of predictive coordinate points to be used. FIG. 8C shows touch coordinate points recognized when drawing a first stroke 830 (e.g., a large circle) having a relatively small angular acceleration and a second stroke 840 (e.g., a small circle) having a relatively large angular acceleration in a user's handwriting input. The processor may calculate the angular acceleration of the handwriting input by using the received touch coordinate points.

TABLE 1

| Classification | Definition | Threshold (single) | Threshold (multiple) |
|---|---|---|---|
| Velocity (speed) | $v = \dfrac{\text{distance}}{\text{time}}$ | $T^v$ | $T_{low}{}^v, T_{high}{}^v$ |
| Acceleration | $\Delta v = v_2 - v_1$ | $T^{\Delta v}$ | $T_{dec}{}^{\Delta v}, T_{inc}{}^{\Delta v}$ |
| Angular velocity (angular speed) | $w = \dfrac{\text{angle}}{\text{time}}$ | $T^w$ | $T_{low}{}^w, T_{high}{}^w$ |
| Angular acceleration | $\Delta w = w_2 - w_1$ | $T^{\Delta w}$ | $T_{dec}{}^{\Delta w}, T_{inc}{}^{\Delta w}$ |

According to various embodiments, the processor may determine the number of predictive coordinate points to be used, based on the calculated input characteristic (e.g., velocity, acceleration, angular velocity, angular acceleration). The processor may configure at least one threshold value for each item of the input characteristic. The processor may determine a different number of threshold values for respective items of the input characteristic, and depending on the number of threshold values generated by the processor, the number of cases in which the number of predictive coordinate points to be used may vary. With reference to Table 1, the processor may configure at least one threshold value for each input characteristic and, based on the error probability of the predictive coordinate points, determine the threshold value of each item. For example, the processor may configure a velocity threshold value for the velocity item in the input characteristic, configure an acceleration threshold value for the acceleration item, configure first and second angular velocity threshold values for the angular velocity item, and configure first and second angular acceleration threshold values for the angular acceleration item. Based on the configured threshold values, the processor may define sections in which measured values can be distributed. For example, in case of the angular acceleration item, because two threshold values are configured, a total of three sections may be defined such as a rotational deceleration section, a rotational constant speed section, and a rotational acceleration section. The processor may define at least one combination (e.g., 36) according to the number of sections defined for each input characteristic.

According to various embodiments, based on the combination defined in the above method, the processor may determine the number of predictive coordinate points to be used. For example, the processor may define a case in which a velocity measurement value is less than a threshold value ($T^N$) as one combination, and determine to use all predictive coordinate values generated regardless of measurement values of acceleration, angular velocity, and angular acceleration. According to another embodiment, when a velocity measurement value is greater than the corresponding threshold value and when measurement values of acceleration and angular acceleration are greater than the corresponding threshold values, it may be determined not to use any predictive coordinate point. According to still another embodiment, when an acceleration measurement value is greater than the corresponding threshold value but an angular acceleration measurement value is less than the corresponding threshold value, it may be determined to use only one predictive coordinate value. The number of combinations that the processor can define and the number of predictive coordinate points used accordingly are not limited to the above-mentioned embodiments.

According to various embodiments, an electronic device includes a display, a memory, and a processor operatively connected to the display and the memory. The processor may be configured to, upon receiving at least one touch input to the display, analyze an input characteristic of the at least one touch input, to, based on the at least one touch input, generate predictive coordinate points respectively corresponding to a plurality of different time points, and to, based on the input characteristic, determine the number of predictive coordinate points to be used.

According to various embodiments, the processor may be configured to, based on the input characteristic, determine whether an unstable state is present, and to, upon determining as the unstable state, determine the number of predictive coordinate points to be used in accordance with a predetermined criterion.

According to various embodiments, the processor may be configured to determine as the unstable state when an overall length of a predictive path is equal to or greater than a predetermined length.

According to various embodiments, the processor may be configured to determine as the unstable state when a distance between a first predictive coordinate point and a second predictive coordinate point continuous to the first predictive coordinate point is equal to or greater than a predetermined value.

According to various embodiments, the processor may be configured to determine as the unstable state when a travel angle of a predictive path is equal to or greater than a predetermined angle.

According to various embodiments, the input characteristic may include at least one of an x coordinate, a y coordinate, a coordinate distance, a velocity, an acceleration, an angular acceleration, a tilt, and an orientation.

According to various embodiments, the processor may be configured to determine a velocity reference value, and to, based on the input characteristic and the velocity reference value, determine the number of predictive coordinate points to be used.

According to various embodiments, the processor may be configured to determine an acceleration reference value, and to, based on the input characteristic and the acceleration reference value, determine the number of predictive coordinate points to be used.

According to various embodiments, the processor may be configured to determine a predictive path using the predictive coordinate points.

According to various embodiments, the processor may be configured to determine a curve connecting at least one of the predictive coordinate points as the predictive path.

According to various embodiments, the processor may be configured to generate a coordinate predictive model through machine learning based on the input characteristic, and to generate at least one predictive coordinate point by using the coordinate predictive model.

According to various embodiments, the coordinate predictive model may include a convolutional neural network (CNN) block for extracting temporal information of the predictive coordinate point, and a recurrent neural network (RNN) block for extracting spatial information of the predictive coordinate point.

Figure 9:
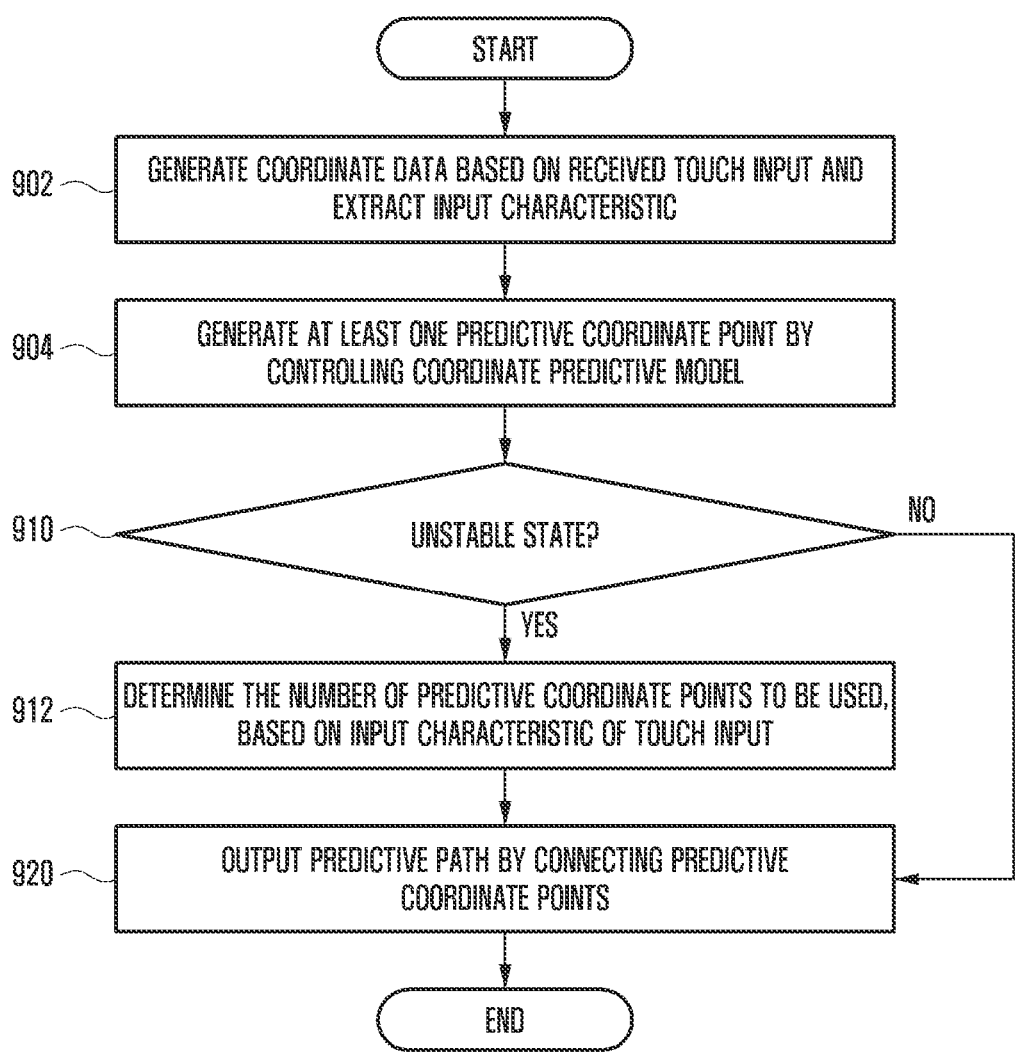
FIG. 9 is a flow diagram illustrating a method for generating a predictive coordinate point at an electronic device according to an embodiment of the disclosure.

FIG. 9 is a flow diagram illustrating a method for generating a predictive coordinate point at an electronic device according to an embodiment of the disclosure.

The method shown in FIG. 9 may be performed by an electronic device (e.g., an electronic device 101 in FIG. 1 or an electronic device 300 in FIG. 3) described with reference to FIGS. 1, 2A to 2C, 3 to 7, and 8A to 8C, and the above-described technical features will be omitted from the following description.

Referring to FIG. 9, according to various embodiments, at operation 902, the electronic device may generate coordinate data based on a received touch input and extract an input characteristic. The electronic device may extract the input characteristic by analyzing at least one input coordinate point (e.g., the at least one input coordinate point 400 in FIG. 4). The electronic device may transmit information about the received input coordinate points to the coordinate predictive model. The electronic device may control the coordinate predictive model to analyze the input coordinate points and extract the input characteristic for one or more input coordinate points and a combination thereof. The input characteristic may include at least one of an x coordinate, a y coordinate, a coordinate distance, a velocity, an acceleration, an angular velocity, an angular acceleration, a pen pressure, a tilt, and an orientation of a touch input.

According to various embodiments, at operation 904, the electronic device may generate at least one predictive coordinate point (e.g., the at least one predictive coordinate point 410 in FIG. 4) by controlling the coordinate predictive model. Different predictive coordinate points generated by the electronic device may correspond to different time points, respectively. According to an embodiment, the electronic device may generate predictive coordinate points at predetermined time intervals (e.g., every 8 ms) from the current time point or generate predictive coordinate points corresponding to a plurality of time points without fixed time intervals. The electronic device may generate the predictive coordinate points by controlling the coordinate predictive model. The coordinate predictive model may generate the predictive coordinate points through machine learning based on at least one received input coordinate point and the analyzed input characteristic.

According to various embodiments, the electronic device may generate the predictive coordinate points in consideration of input coordinate points entered up to a time point of generating the predictive coordinate points and other generated predictive coordinate points.

According to various embodiments, at operation 910, the electronic device may determine whether it is in an unstable state. If the current input state is unstable, or if such a state is not previously learned from the coordinate predictive model, the electronic device may generate abnormal predictive coordinate points, and thus a large error may occur. When the error of the outputted predictive path is expected to be large, the electronic device may determine as an unstable state and output the predictive path to be relatively short by using only a part of the generated predictive coordinate points. The electronic device may determine the number of predictive coordinate points to be used in an unstable state in accordance with a predetermined criterion.

According to an embodiment, the electronic device may determine as an unstable state when the overall length of the predictive path is equal to or greater than a predetermined length. The electronic device may generate a plurality of predictive coordinate points for respective time zones and output the predictive path by connecting the predictive coordinate points. The electronic device may determine a reference value of the overall length of the predictive path, and determine as the unstable state when the overall length of the outputted predictive path is equal to or greater than the reference value. The electronic device may determine the reference value of the overall length of the predictive path that is large enough to significantly correct time delay due to rendering and small enough that an error between the predictive path and an actual path is not too large.

According to an embodiment, the electronic device may determine as an unstable state when a distance difference between predictive coordinate points is equal to or greater than a predetermined value. The electronic device may determine a reference value of the distance difference between the predictive coordinate points, and determine as the unstable state when a distance between two predictive coordinate points of the closest time zones is equal to or greater than the reference value.

According to an embodiment, the electronic device may determine as an unstable state when a travel angle of a predictive path based on predictive coordinate points is equal to or greater than a predetermined angle. The electronic device may determine a reference value of the travel angle of the predictive path, and determine as the unstable state when the travel angle of the predictive path is equal to or greater than the reference value.

According to various embodiments, the electronic device may determine the number of predictive coordinate points to be used, based on an input characteristic. The electronic device may determine a reference value for at least a part of the input characteristic and determine the number of predictive coordinate points to be used by comparing a measured value with the reference value.

According to various embodiments, at operation 912, the electronic device may determine the number of predictive coordinate points to be used, based on the input characteristic and output characteristic of a touch input. When it is determined that a prediction error with respect to the final predictive coordinate point is highly likely to occur or the prediction accuracy is low, the electronic device may conservatively perform correction by using only some of the generated predictive coordinate points. If it is determined that a prediction error is unlikely to occur at a later time point, the electronic device may perform active time delay correction by using all the generated predictive coordinate points.

According to various embodiments, at operation 920, the electronic device may output a predictive path by connecting the predictive coordinate points. The electronic device may output the predictive path by connecting the predictive coordinate points determined to be used. According to an embodiment, the electronic device may output the predictive path connecting the predictive coordinate points in the form of a curve.

Figure 10:
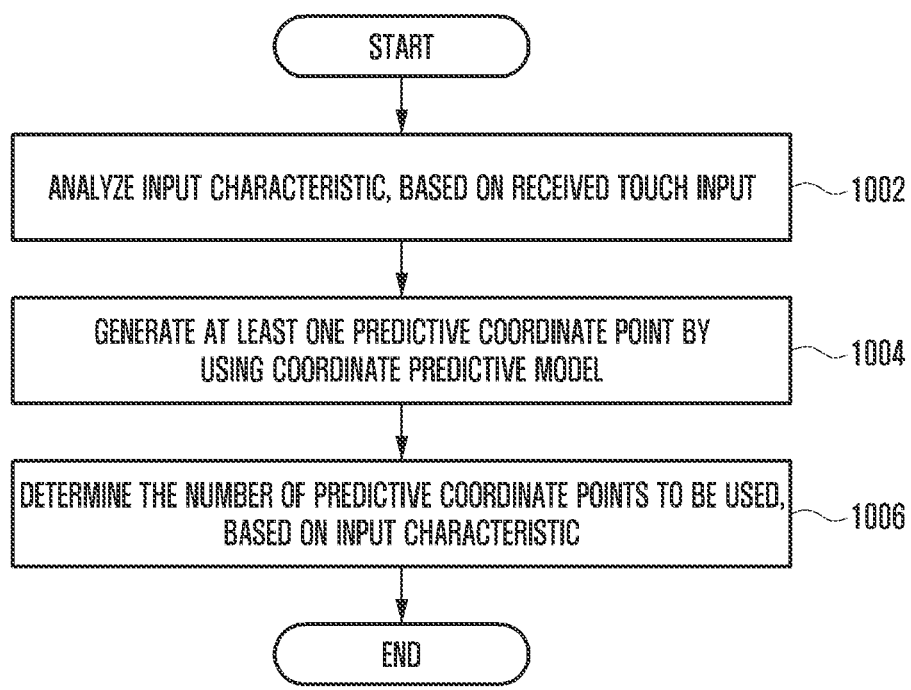
FIG. 10 is a flow diagram illustrating a method of determining a number of predictive coordinate points to be used at an electronic device according to an embodiment of the disclosure.

FIG. 10 is a flow diagram illustrating a method of determining a number of predictive coordinate points to be used at an electronic device according to an embodiment of the disclosure.

Referring to FIG. 10, according to various embodiments, at operation 1002, an electronic device may analyze an input characteristic, based on a received touch input. The electronic device may receive a touch input to a display and acquire at least one input coordinate point. The electronic device may acquire input coordinate points at selected time intervals and analyze input characteristics based on the acquired input coordinate points. The input characteristic may include at least one of a velocity, an acceleration, an angular velocity, and an angular acceleration of the handwriting input. The electronic device may analyze the input characteristic by calculating a distance and orientation between adjacent input coordinate points.

According to various embodiments, at operation 1004, the electronic device may generate at least one predictive coordinate point by using a coordinate predictive model. The electronic device may establish a coordinate prediction model by using a coordinate predictive module (e.g., the coordinate predictive module 340 in FIG. 3) and generate at least one predictive coordinate point by using the input coordinate points and the coordinate predictive model. According to an embodiment, the coordinate predictive model may learn spatial characteristics and temporal characteristics of a handwriting input by using at least one input coordinate point and generate at least one predictive coordinate point on a display at which the handwriting input will occur.

According to various embodiments, at operation 1006, the electronic device may determine the number of predictive coordinate points to be used, based on the input characteristic. The electronic device may configure at least one threshold value for each item of the input characteristic and, based on the configured threshold value, divide each item of the input characteristic into at least one section. The electronic device may define at least one combination according to the number of sections generated for each input characteristic and determine the number of predictive coordinate points to be used for each combination.

According to various embodiments, a method for predicting handwriting input coordinates of an electronic device may include, upon receiving at least one touch input to a display, analyzing an input characteristic of the at least one touch input, based on the at least one touch input, generating predictive coordinate points respectively corresponding to a plurality of different time points, and based on the input characteristic, determining the number of predictive coordinate points to be used.

According to various embodiments, determining the number of predictive coordinate points to be used may include, based on the input characteristic, determining whether an unstable state is present, and upon determining as the unstable state, determining the number of predictive coordinate points to be used in accordance with a predetermined criterion.

According to various embodiments, determining whether an unstable state is present may include determining as the unstable state when an overall length of a predictive path is equal to or greater than a predetermined length.

According to various embodiments, determining whether an unstable state is present may include determining as the unstable state when a distance between a first predictive coordinate point and a second predictive coordinate point continuous to the first predictive coordinate point is equal to or greater than a predetermined value.

According to various embodiments, determining whether an unstable state is present may include determining as the unstable state when a travel angle of a predictive path is equal to or greater than a predetermined angle.

According to various embodiments, the input characteristic may include at least one of an x coordinate, a y coordinate, a coordinate distance, a velocity, an acceleration, an angular acceleration, a tilt, and an orientation.

According to various embodiments, determining the number of predictive coordinate points to be used may include determining a velocity reference value, and based on the input characteristic and the velocity reference value, determining the number of predictive coordinate points to be used.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. An electronic device comprising:
a display;
a memory; and
a processor operatively connected to the display and the memory, the processor being configured to:
 in response to receiving at least one touch input on the display, analyze an input characteristic of the at least one touch input,
 based on the at least one touch input, generate predictive coordinate points corresponding to a plurality of different time points, respectively, and
 based on the input characteristic, determine a number of predictive coordinate points to be used from among the generated predictive coordinate points.

2. The electronic device of claim 1, wherein the processor is further configured to:
based on the input characteristic, determine whether an unstable state is present, and
in response to determining the unstable state is present, determine the number of predictive coordinate points to be used from among the generated predictive coordinate points based on a predetermined criterion.

3. The electronic device of claim 2, wherein the processor is further configured to:
based on an overall length of a predictive path being equal to or greater than a predetermined length, determine the unstable state is present.

4. The electronic device of claim 2, wherein the processor is further configured to:
based on a distance between a first predictive coordinate point and a second predictive coordinate point continuous to the first predictive coordinate point being equal to or greater than a predetermined value, determine the unstable state is present.

5. The electronic device of claim 2, wherein the processor is further configured to:
based on a travel angle of a predictive path being equal to or greater than a predetermined angle, determine the unstable state is present.

6. The electronic device of claim 1, wherein the input characteristic comprises at least one of an x coordinate, a y coordinate, a coordinate distance, a velocity, an acceleration, an angular acceleration, a tilt, or an orientation.

7. The electronic device of claim 6, wherein the processor is further configured to:
determine a velocity reference value, and
based on the input characteristic and the velocity reference value, determine the number of predictive coordinate points to be used from among the generated predictive coordinate points.

8. The electronic device of claim 6, wherein the processor is further configured to:
determine an acceleration reference value, and
based on the input characteristic and the acceleration reference value, determine the number of predictive coordinate points to be used from among the generated predictive coordinate points.

9. The electronic device of claim 1, wherein the processor is further configured to:
   determine a predictive path using the predictive coordinate points.

10. The electronic device of claim 9, wherein the processor is further configured to:
    determine a curve connecting at least one of the predictive coordinate points as the predictive path.

11. The electronic device of claim 1, wherein the processor is further configured to:
    based on the input characteristic, generate a coordinate predictive model through machine learning, and
    generate at least one predictive coordinate point by using the coordinate predictive model.

12. The electronic device of claim 11, wherein the coordinate predictive model comprises a convolutional neural network (CNN) block for extracting temporal information of the at least one predictive coordinate point, and a recurrent neural network (RNN) block for extracting spatial information of the at least one predictive coordinate point.

13. A method for predicting handwriting input coordinates of an electronic device, the method comprising:
    in response to receiving at least one touch input to a display, analyzing an input characteristic of the at least one touch input;
    based on the at least one touch input, generating predictive coordinate points corresponding to a plurality of different time points, respectively; and
    based on the input characteristic, determining a number of predictive coordinate points to be used from among the generated predictive coordinate points.

14. The method of claim 13, wherein the determining of the number of predictive coordinate points to be used comprises:
    based on the input characteristic, determining whether an unstable state is present; and
    in response to determining the unstable state is present, determining the number of predictive coordinate points to be used from among the generated predictive coordinate points based on a predetermined criterion.

15. The method of claim 14, wherein the determining of whether the unstable state is present comprises:
    based on an overall length of a predictive path being equal to or greater than a predetermined length, determining the unstable state is present.

16. The method of claim 15, further comprising:
    in response to a prediction error of the predictive path being greater than a predetermined value, outputting the predictive path by using only a part of the generated predictive coordinate points.

17. The method of claim 15, wherein the predictive path comprises an abrupt change of direction based on previously inputted coordinate points including a path comprising curved coordinate points.

18. The method of claim 14, wherein the determining of whether the unstable state is present comprises:
    based on a distance between a first predictive coordinate point and a second predictive coordinate point continuous to the first predictive coordinate point being equal to or greater than a predetermined value, determining the unstable state is present.

19. The method of claim 14, wherein the determining of whether the unstable state is present comprises:
    based on a travel angle of a predictive path being equal to or greater than a predetermined angle, determining the unstable state is present.

20. The method of claim 13, wherein the input characteristic comprises at least one of an x coordinate, a y coordinate, a coordinate distance, a velocity, an acceleration, an angular acceleration, a tilt, or an orientation.

21. The method of claim 20, wherein the determining of the number of predictive coordinate points to be used comprises:
    determining a velocity reference value; and
    based on the input characteristic and the velocity reference value, determining the number of predictive coordinate points to be used from among the generated predictive coordinate points.

22. The method of claim 20, wherein the determining of the number of predictive coordinate points to be used comprises:
    determining an acceleration reference value; and
    based on the input characteristic and the acceleration reference value, determining the number of predictive coordinate points to be used from among the generated predictive coordinate points.

23. The method of claim 13, further comprising:
    in response to the input characteristic being equal to or greater than a first reference value, determining the number of predictive coordinate points as a first number;
    in response to the input characteristic being less than the first reference value and equal to or greater than a second reference value less than the first reference value, determining the number of predictive coordinate points as a second number different from the first number;
    in response to the input characteristic being less than the second reference value and equal to or greater than a third reference value less than the second reference value, determining the number of predictive coordinate points as a third number different from the first number and the second number; and
    in response to the input characteristic being less than the third reference value, determining the number of predictive coordinate points as a fourth number different from the first number, the second number, and the third number.

* * * * *